Aug. 15, 1950   T. HINDMARCH   2,518,781
POWER TRANSMISSION MECHANISM
Filed March 9, 1945   9 Sheets-Sheet 1

Inventor
T. Hindmarch
By Glascock Downing Seifeld
Attys.

Patented Aug. 15, 1950

2,518,781

UNITED STATES PATENT OFFICE 2,518,781

POWER TRANSMISSION MECHANISM

Thomas Hindmarch, London, England

Application March 9, 1945, Serial No. 581,885
In Great Britain March 1, 1944

4 Claims. (Cl. 74—665)

This invention relates to power transmission mechanisms and has for its principal object to provide a compact and at the same time flexible arrangement of mechanism such as will be particularly suitable for the propulsion of ships or boats but which will be capable of general application in any situation in which the advantages derived from the invention may be found desirable.

The invention consists in power transmission mechanism comprising a plurality of gear units each having its own associated prime mover and each comprising an input shaft and an output shaft with gears associated therewith by which the output shaft may be driven in either of two directions, a main output or power shaft (or shafts) connected by suitable means to the gear unit output shafts, and means by which any one or more of the prime movers for the gear units may be selected to drive the main output or power shaft (or shafts).

The invention also consists in power transmission mechanism according to the preceding paragraph in which each of the gear units embodies pressure oil-operated clutches or couplings, in association with its input and/or output gears, by which the said gear unit may be selected to drive the main output shaft in one direction or the other, or may remain in the neutral position.

The invention also consists in power transmission mechanism according to the preceding paragraph in which means are provided to ensure that all gear units selected to drive the main output shaft shall drive in the correct direction.

The invention further consists in power transmission mechanism according to either of the three preceding paragraphs in which the gear units are all contained in or mounted on the main housing containing the main output or power shaft.

The invention also consists in a power transmission mechanism according to any one of the three penultimate preceding paragraphs in which the gear units are separate from the main gear housing but coupled thereto by flexible couplings.

The invention also consists in a power transmission mechanism according to the preceding paragraphs in which oil operated clutches or couplings are incorporated or associated with each gear unit input, and/or output shaft, so as to isolate at will any one or more than one of the input or output shafts, it being understood that the oil operated clutches or couplings can either be situated inside any of the gear casings or fitted as a separate unit in a suitable housing and coupled to either the input and/or output shaft of the gear unit.

The invention also consists in a power transmission mechanism according to the preceding paragraph wherein each gear unit serves the purpose of transmitting the power from its respective prime mover by means of an oil operated clutch or coupling on to a common output shaft, thus enabling the prime mover to be isolated from the main gear unit at will, the oil operated clutch or coupling referred to above and its associated pressure oil pump and/or pumps and control unit or units being of such a design as to effect in unison as may be desired the engagement or disengagement of the said clutch on all the gear units at the moment the direction of rotation of the main shaft is being reversed.

Further features of the invention will be apparent from the description given hereafter.

The accompanying drawings illustrate several modes of carrying out the invention.

Figure 1:
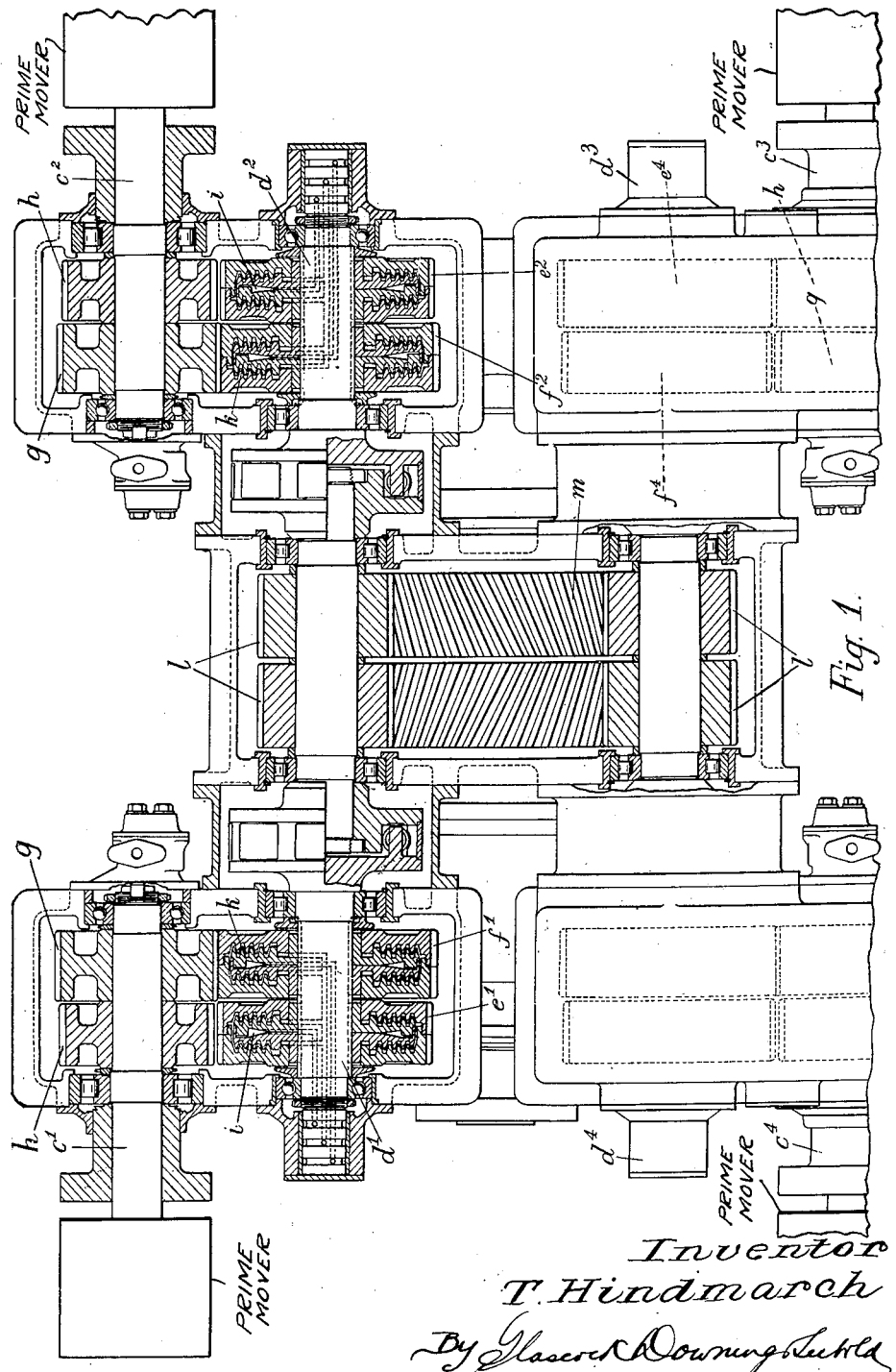
Figure 1 is a part sectional plan view of one form of transmission in accordance with the invention.
Figure 2:
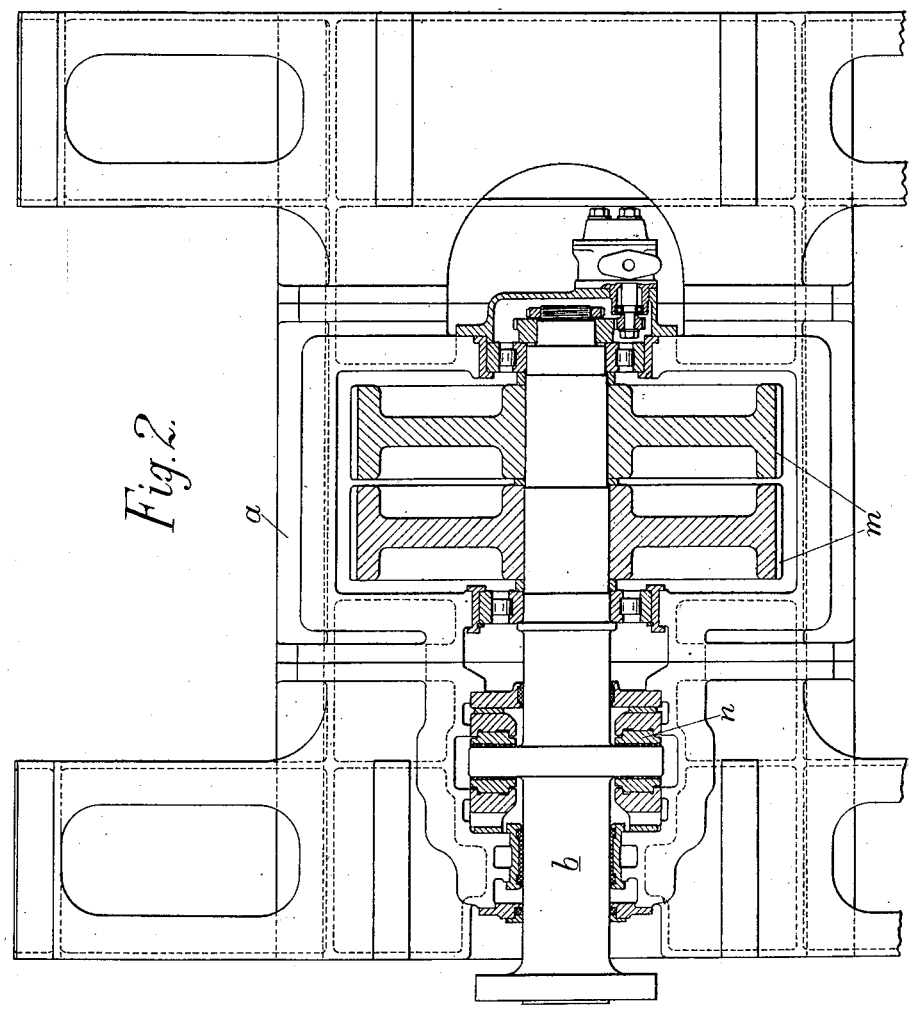
Figure 2 is a part sectional plan of the arrangement shown in Figure 1, the section being taken on a lower plane.

In carrying my invention into effect in one convenient manner as illustrated in Figures 1 and 2, I provide a main housing $a$ containing a main output or power shaft $b$ and upon the housing $a$ I bolt or otherwise secure frames, housings, or supports for, say, four auxiliary gear units each of which comprises an input or primary shaft $c'$ $c^2$ $c^3$ $c^4$ suitably coupled to its own associated prime mover as shown diagrammatically in Figure 1. Each gear unit also comprises an output shaft ($d'$ $d^2$ $d^3$ $d^4$) upon which are loosely mounted two gear wheels ($e'$ $f'$, $e^2$ $f^2$, $e^3$ $f^3$, $e^4$ $f^4$) one of which ($f'$ $f^2$ $f^3$ $f^4$) meshes directly with a gear wheel $g$ fixed upon the input shaft for driving ahead while the other ($e'$ $e^2$ $e^3$ $e^4$) gears indirectly through an intermediate gear (not shown) with a second gear wheel $h$ fixed upon the input shaft for driving astern. Each of the gear wheels $e'$ $f'$, etc. upon the output shaft has located therein or attached thereto by suitable means, an oil-operated clutch or coupling $i$ $k$ which may, for example, be constructed and arranged generally in the manner described and claimed in the specification of British Patent No. 382,865 or No. 438,563.

It will of course be understood that the pressure oil-operated clutches or couplings may be associated with the gears $g$ $h$ upon the input shaft (which will then be loose on the shaft) and/or any intermediate shaft or shafts, if found convenient, instead of with those upon the output shaft as shown, and it will further be understood that each gear unit may contain more than one ahead and/or astern train of gears each incorporating oil-operated clutches or couplings so that each gear unit may be capable of giving more than one speed ahead and/or astern.

It will also be understood that the respective gear units may be arranged so that their input shafts rotate all at the same speed or at different speeds and the prime movers for the gear units may be all of the same or of different powers.

The output shafts of all the gear units are, however, coupled by suitable gearing $l$ $m$ or other coupling means with the main output or power shaft $b$ (or shafts) and the latter may when necessary or desirable incorporate a suitable device (such as a thrust bearing $n$ or the like) to take any axial thrust load which may be imposed upon the shaft as, for example, when the latter is used to drive a ship's propeller.

Figure 3:
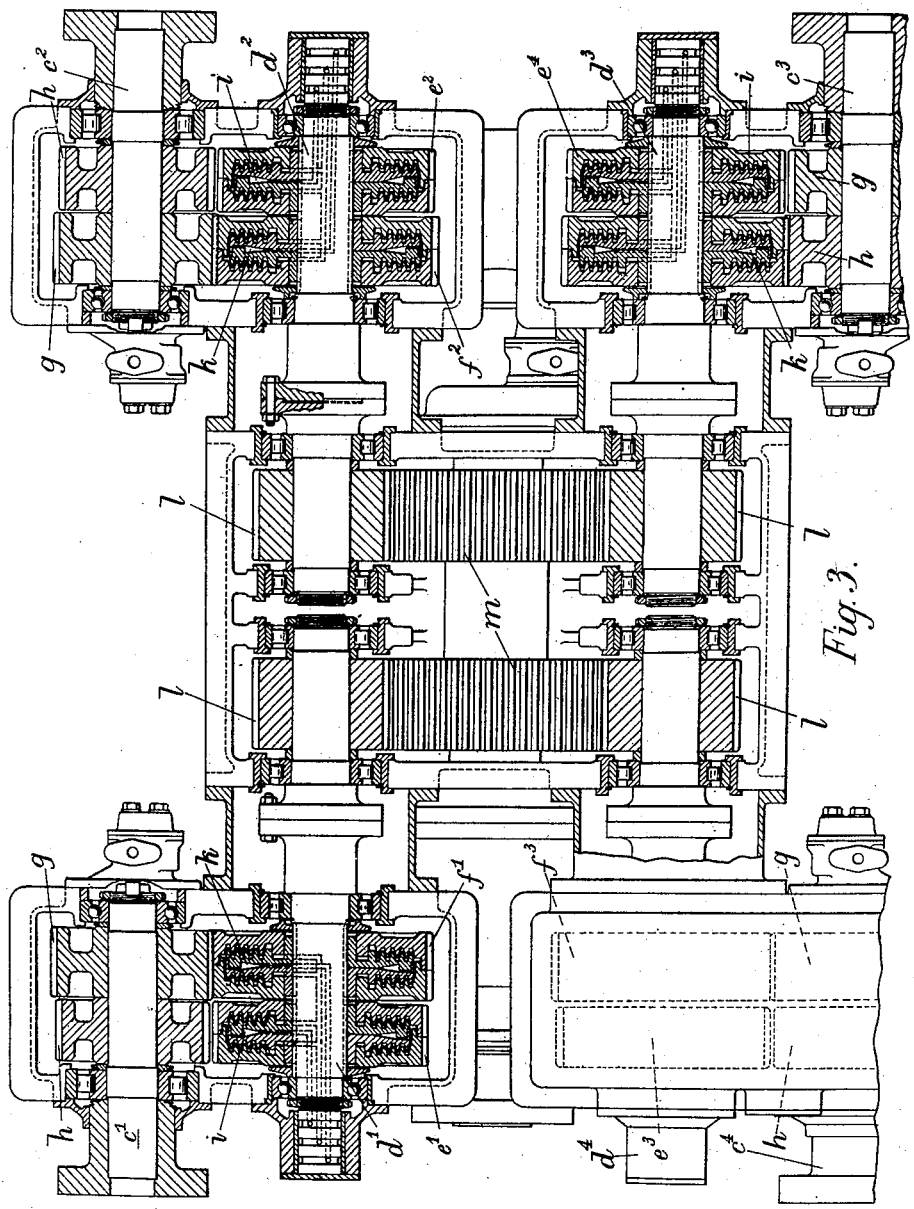
Figure 3 is a similar view to Figure 1 showing a slightly different form of transmission.

When the gear units are four or other even number they may be disposed in pairs such that the output shafts of one pair are united to form a common input shaft for the main gear as shown in Figures 1 and 2, or, alternatively, each of the gear units may be provided with its own independent output shaft and all such separate driving shafts will be connected by suitable gears to drive on to the common main power shaft as shown in Figure 3.

It will of course be understood that the invention is not limited to any particular number of gear units driving on to a common output or power shaft or shafts since I may employ two or more of such units as may be found convenient, and in some cases in accordance with the invention I may employ pressure oil-operated clutches or couplings in association with the main gear as well as in association with the gear units. Moreover, in place of mounting the latter upon or within a common housing containing also the main gear the latter may be arranged in its housing and the gear units may be separate from said housing but connected to the main output shaft therein by any suitable form of flexible couplings.

Figure 4:
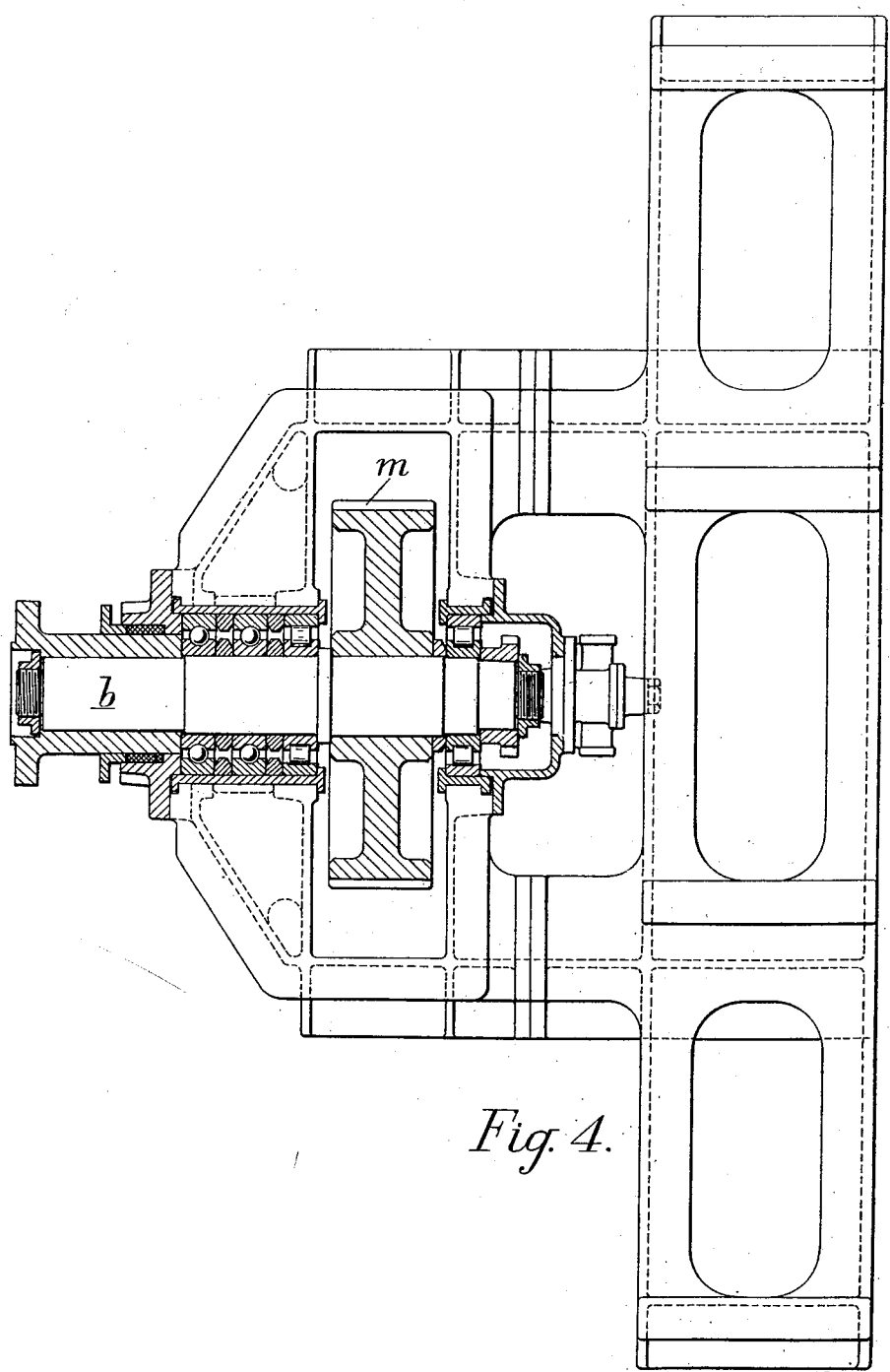
Figures 4 and 5 are similar views to Figures 1 and 2 showing a further modified form of transmission.
Figure 5:
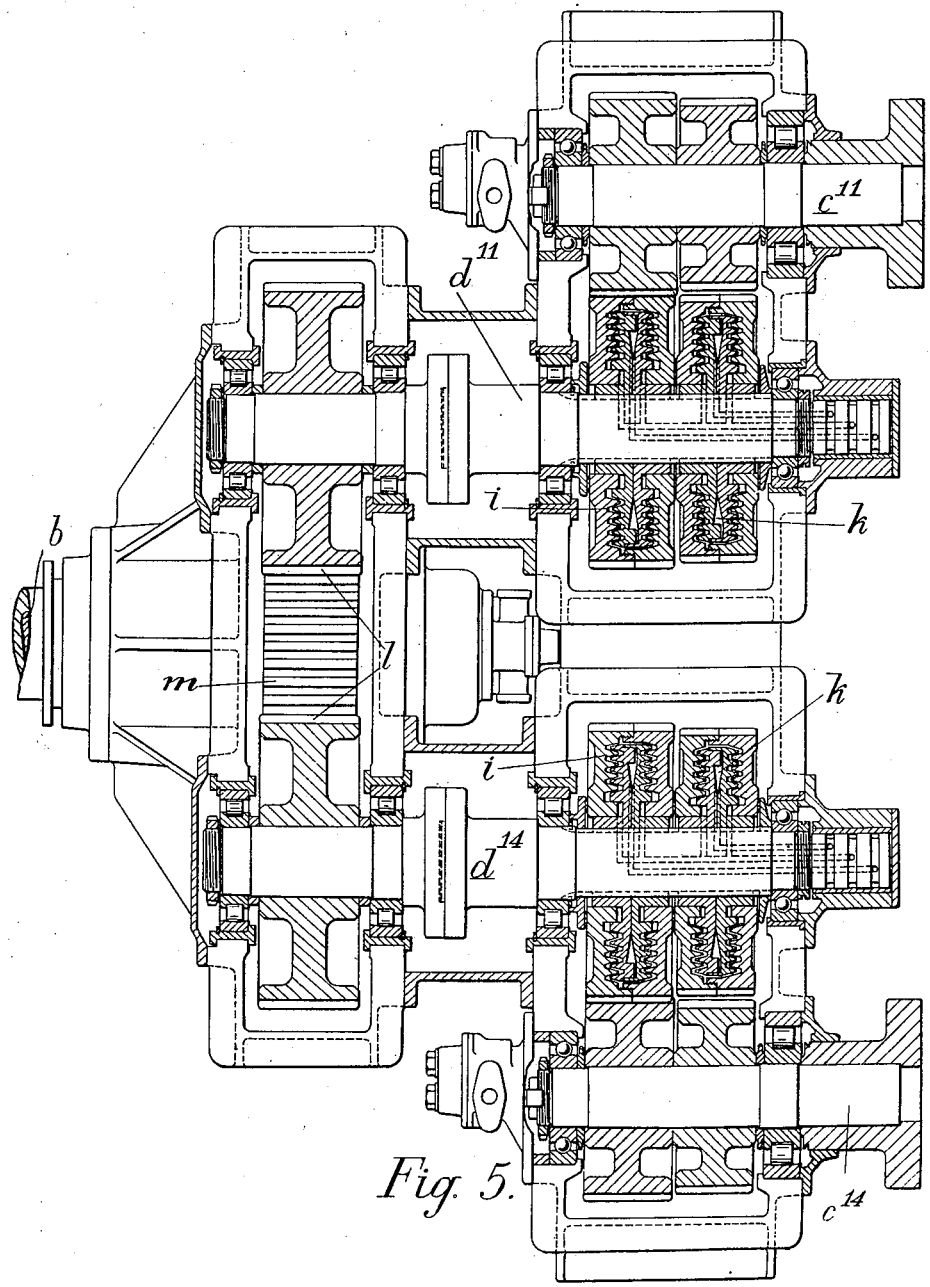
Figure 6:
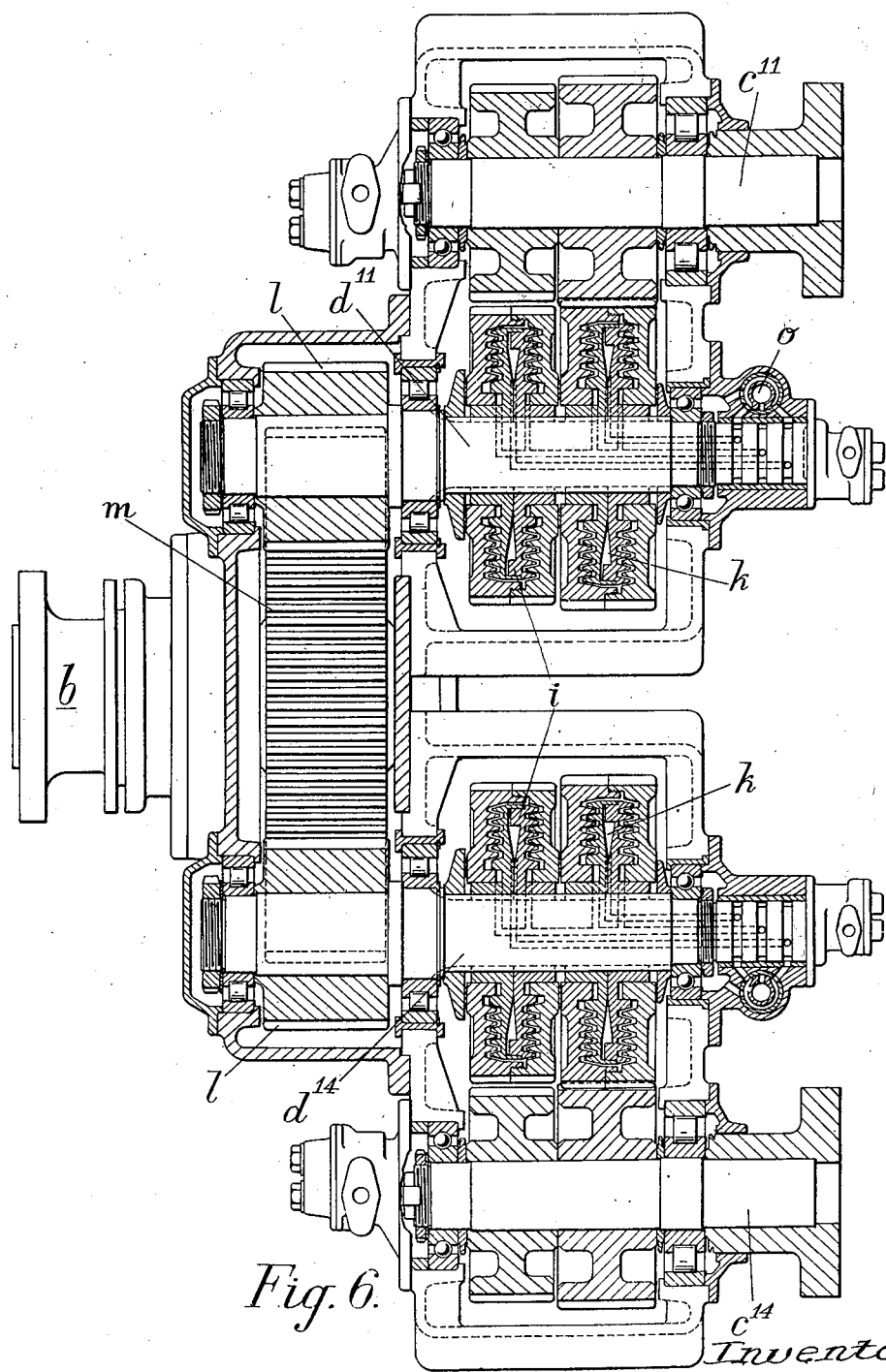
Figure 6 is a similar view to Figure 5 showing a still further modification.
Figure 7:
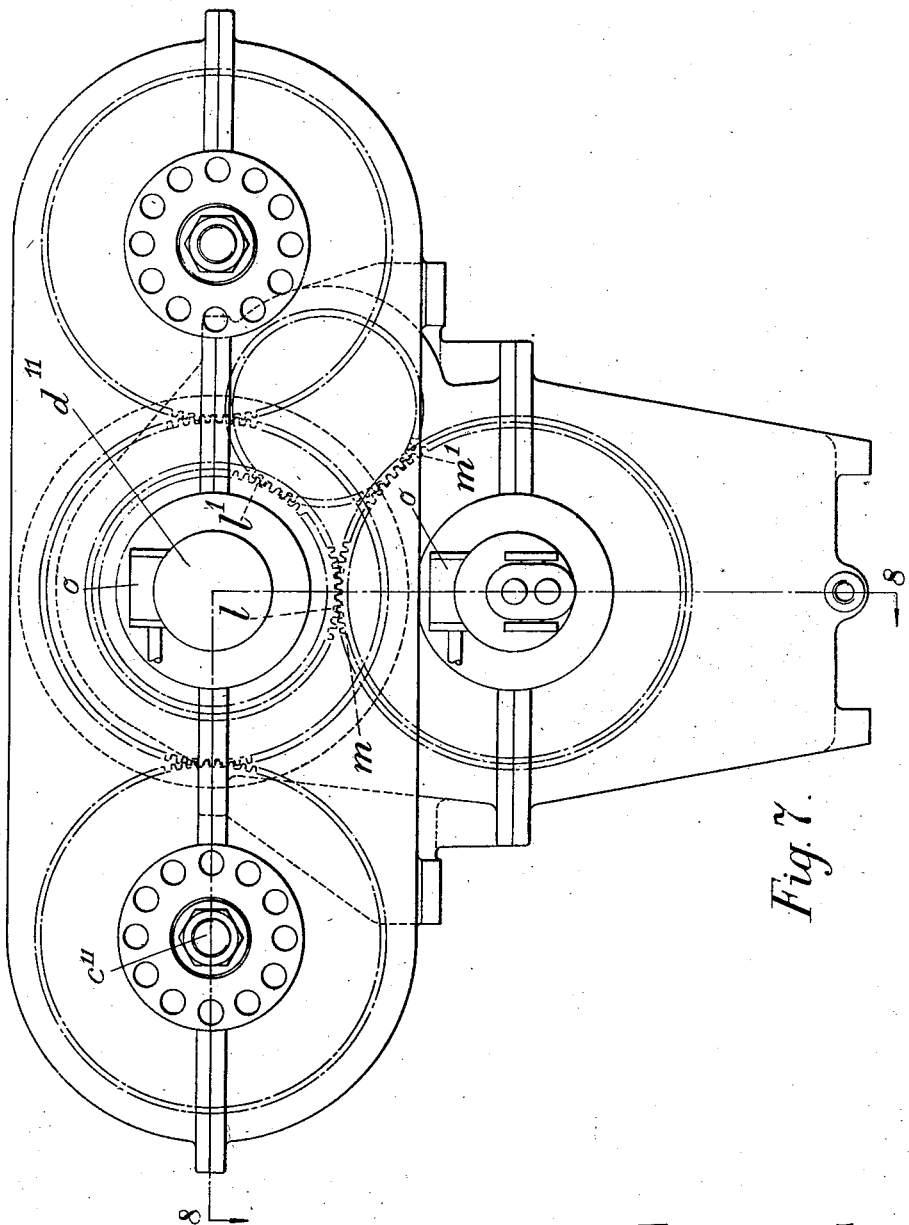
Figure 7 is an outside elevation of a still further modification.
Figure 8:
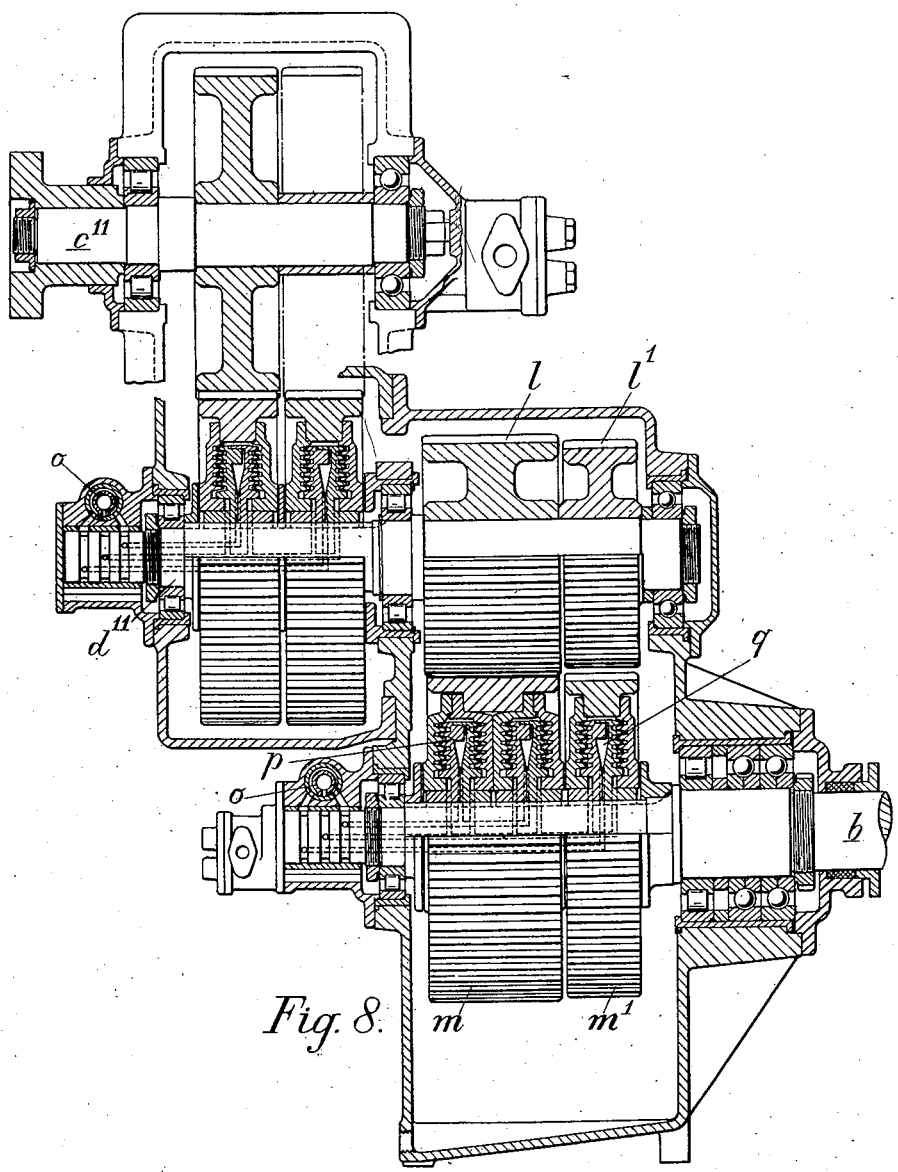
Figure 8 is a section on the line 8—8 of Figure 7.
Figure 9:
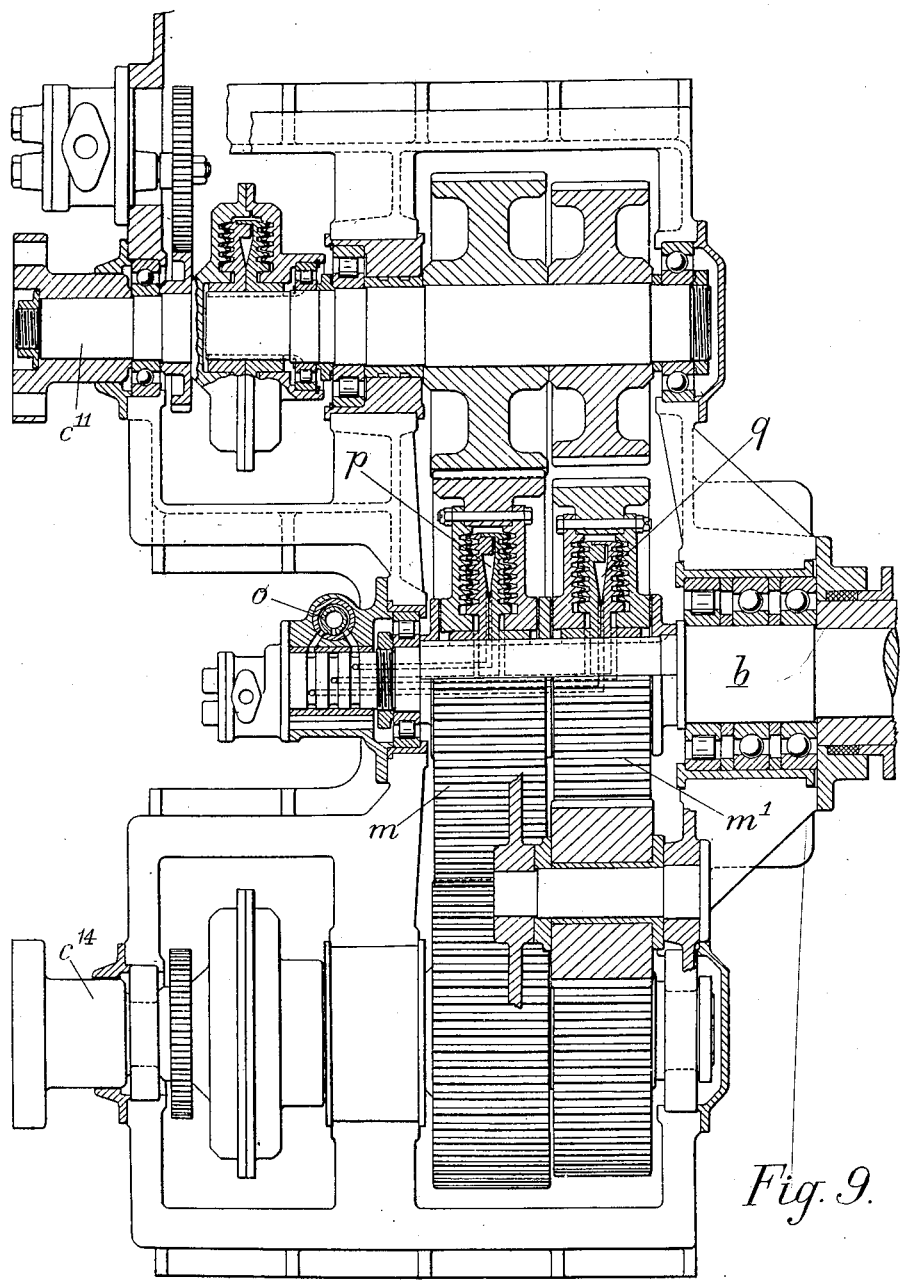
Figure 9 is a sectional plan of yet a further modified form of transmission.

Figures 4 and 5 are two views illustrating a modified form of gearing in which there are two gear units only driving on to a common output shaft. Each gear unit has an input shaft ($c^{11}$ $c^{14}$) and an output shaft ($d^{11}$ $d^{14}$) and the gears on either of said shafts may be associated with pressure oil operated or like couplings $i$ $k$. Both output shafts are arranged to drive on to the common power shaft by the gearing $l$ $m$. Figure 6 shows a slight modification of this last form of gear and in this figure I also show the valves $o$ by which the oil-operated couplings are controlled. Figures 7 and 8 show a further modified gear with two units driving on to a common main shaft, but in this case the main gear unit $l$ $m$, $l'$ $m'$ connecting the output shafts and the main shaft also embodies pressure oil-operated or like couplings $p$ $q$. Figure 9 shows a slight modification of this last form of gear, and its construction will be obvious from an inspection of the drawing in conjunction with the foregoing description.

The invention is not to be limited to the foregoing details of construction which are given by way of example only as I may modify the relative arrangement of the input and output shafts, the nature of the gearing coupling the same, the number of gear units, and the means of coupling the same to a common output shaft depending upon the purpose for which the power transmission mechanism is to be employed or any practical requirements that may have to be fulfilled.

I claim:

1. Power transmission mechanism comprising in combination a plurality of prime movers, a gear unit driven by each of said prime movers comprising an output shaft and an input shaft parallel with one another and with intermeshing ahead and reverse gears thereon, the gears on each output shaft being arranged side by side thereon, pressure oil operated friction clutches on one of said shafts for selectively connecting one of the gears to said shaft by which selection of the gear unit for operation and of direction of drive may be obtained, and a main power shaft connected by gearing to the gear unit output shafts.

2. Power transmission mechanism according to claim 1 in which the gear units are arranged in pairs with the output shafts of each pair united to form a common input shaft for the main gear.

3. Power transmission mechanism according to claim 1 having a main housing containing the main power shaft and gearing therefor, said gear units being mounted on said main housing.

4. Power transmission mechanism comprising a plurality of prime movers, a gear unit driven by each of said prime movers comprising an input and an output shaft with intermeshing ahead and reverse gears thereon, the gears on each output shaft being arranged side by side thereon, pressure oil-operated friction clutches on one of said shafts for selectively connecting the gears thereon to said shaft by which selection of the gear units to be driven and the direction of drive may be obtained, control means for said clutches such that the engagement and disengagement of the gear units may be effected in unison at the moment the direction of rotation of the main shaft is being reversed, and having a main housing containing the main power shaft and gearing therefor, said gear units being mounted on said main housing.

THOMAS HINDMARCH.

REFERENCES CITED

The following references are of record in the file of this patent:

UNITED STATES PATENTS

| Number | Name | Date |
|---|---|---|
| 1,682,358 | Sperry | Aug. 28, 1928 |
| 1,731,076 | Maurer | Oct. 8, 1929 |
| 1,748,827 | Boltshauser | Feb. 25, 1930 |
| 1,896,440 | Durig | Feb. 7, 1933 |
| 2,305,373 | Adamson | Dec. 15, 1942 |
| 2,311,597 | Schmitter | Feb. 16, 1943 |
| 2,383,956 | Cherry et al. | Sept. 4, 1945 |

FOREIGN PATENTS

| Number | Country | Date |
|---|---|---|
| 540,718 | Great Britain | Oct. 27, 1941 |
| 577,438 | Great Britain | May 17, 1946 |